US007870558B2

(12) United States Patent
Fernandes et al.

(10) Patent No.: US 7,870,558 B2
(45) Date of Patent: Jan. 11, 2011

(54) HANDLE PASSING USING AN INTER-PROCESS COMMUNICATION

(75) Inventors: Genevieve Fernandes, Redmond, WA (US); Adrian Marinescu, Issaquah, WA (US); Neill M. Clift, Kirkland, WA (US); Robert H. Earhart, Snohomish, WA (US); Adnan Ilik, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1368 days.

(21) Appl. No.: 11/182,712

(22) Filed: Jul. 15, 2005

(65) Prior Publication Data
US 2007/0014295 A1 Jan. 18, 2007

(51) Int. Cl.
G06F 3/00 (2006.01)
G06F 9/44 (2006.01)
G06F 9/46 (2006.01)
G06F 13/00 (2006.01)

(52) U.S. Cl. .................................... 719/313; 719/314
(58) Field of Classification Search ................. 719/313, 719/314
See application file for complete search history.

(56) References Cited

U.S. PATENT DOCUMENTS 5,187,787 A * 2/1993 Skeen et al. ................. 719/314
5,313,578 A * 5/1994 Handorf ...................... 719/314
5,339,413 A * 8/1994 Koval et al. ................. 719/314

(Continued)

OTHER PUBLICATIONS

Presotto, David L., Ritchie, Dennis M., "Interprocess Communication in the Ninth Edition Unix System", 1996, Lucent Technologies, pp. 1-14.*

*Primary Examiner*—Li B Zhen
*Assistant Examiner*—KimbleAnn Verdi
(74) *Attorney, Agent, or Firm*—Wolf, Greenfield & Sacks, P.C.

(57) ABSTRACT

Sharing access to resources using an inter-process communication ("IPC") provides a connection in which references to resources are passed from a sender to a receiver in a trusted third party environment. A sender in possession of a reference to a resource, such as a handle to an object, may initiate the connection with the receiver. In turn, the receiver may accept or refuse the connection, and may further specify the types of resources in which the receiver is interested when accepting through the connection. Sharing access to resources in this manner advantageously insures that only a process that already has access to a resource is able to share that access with another process, and further that only processes that wish to do so will accept such access.

13 Claims, 7 Drawing Sheets

U.S. PATENT DOCUMENTS

| | | | |
|---|---|---|---|
| 5,446,901 A * | 8/1995 | Owicki et al. | 711/154 |
| 5,448,734 A * | 9/1995 | Hrabik et al. | 719/314 |
| 5,692,157 A * | 11/1997 | Williams | 709/246 |
| 5,737,605 A * | 4/1998 | Cunningham et al. | 719/312 |
| 5,771,383 A * | 6/1998 | Magee et al. | 719/312 |
| 5,802,590 A * | 9/1998 | Draves | 711/164 |
| 6,029,205 A * | 2/2000 | Alferness et al. | 719/310 |
| 6,157,959 A * | 12/2000 | Bonham et al. | 719/313 |
| 6,292,820 B1 * | 9/2001 | Korn | 718/100 |
| 6,338,079 B1 * | 1/2002 | Kanamori et al. | 718/104 |
| 6,647,423 B2 * | 11/2003 | Regnier et al. | 709/229 |
| 6,708,194 B1 * | 3/2004 | Korn | 718/100 |
| 6,904,597 B2 * | 6/2005 | Jin | 719/314 |
| 7,058,955 B2 * | 6/2006 | Porkka | 719/314 |
| 7,089,289 B1 * | 8/2006 | Blackmore et al. | 709/212 |
| 7,152,231 B1 * | 12/2006 | Galluscio et al. | 719/312 |
| 7,334,163 B1 * | 2/2008 | Sallam | 714/38 |
| 7,451,278 B2 * | 11/2008 | Feind et al. | 711/147 |
| 2002/0062402 A1 * | 5/2002 | Regnier et al. | 709/313 |
| 2002/0144006 A1 * | 10/2002 | Cranston et al. | 709/312 |

* cited by examiner

HANDLE PASSING USING AN INTER-PROCESS COMMUNICATION

BACKGROUND

In the WINDOWS® environment, a process may access a system resource indirectly through the use of handles. A handle is a reference to an object representing a system resource. Among other uses, handles may be used to access an object by providing the address of the object in memory and the type of the resource that the object represents.

A process that wants to share access to a resource with another process may do so using the handle. The process must be able to duplicate an existing handle from their own context into the context of the other process with which they want to share access, and vice versa. Processes having this ability must fully trust one another. But in today's operating environment, processes often cannot fully trust one another, thereby limiting the usefulness of handles to share access to resources.

SUMMARY

The foregoing problems with the prior state of the art are overcome by the principles of the present invention, which is directed toward methods, systems, computer program products, and data structures for sharing access to resources using an inter-process communication ("IPC").

According to one aspect of the invention, a sending process ("sender") having access to a resource may share that access with a receiving process ("receiver") using an IPC by initiating an IPC connection with the receiver and passing the resource's reference to the receiver after the IPC connection has been established. The receiver may accept or refuse the IPC connection with the sender. The receiver may further specify the types of resources in which the receiver is interested when accepting the IPC connection. Sharing access to resources in this manner advantageously insures that only a process that already has access to a resource is able to share that access with another process, and further that only processes that wish to do so will accept such access.

According to one other aspect of the invention, senders having access to a resource include processes in possession of a reference to the resource, including, but not limited to, process in possession of a handle to an object representing the resource and any handle-related information.

According to yet another aspect of the invention, passing the resource's reference to the receiver includes initializing the sender's IPC message buffer with a handle and/or any relevant handle information, including but not limited to the value of the handle, the resource type, the allowed access, whether to close the handle, and whether the handle can be inherited. Passing the resource's reference to the receiver further includes initializing the receiver's IPC message buffer with the types of resources to which the receiver is interested in having access. During the connection, the IPC controls which handles are passed during IPC message passing using the sender's and receiver's IPC message buffers.

According to still another aspect of the invention, the IPC controls which handles are passed in a trusted third-party environment such as an operating system kernel. In the trusted third-party environment the IPC processes the handle in the sender's context, determines whether the handle is acceptable to the receiver, and if so, processes the handle in the receiver's context. Processing the handle in the sender's context includes duplicating the handle in a table corresponding to the sender's IPC message buffer, and creating a data structure with the duplicated handle and associated message from the sender's IPC message buffer. Determining whether the handle is acceptable to the receiver includes determining whether the handle references a type of resource to which the receiver is interested in having access and whether the receiver has supplied a message attribute buffer that has allocated space for receiving handles. If the handle is determined to be acceptable, processing the handle in the receiver's context includes duplicating the accepted handle and relevant handle information into a second table corresponding to the receiver's IPC message buffer, and queuing the message to the receiver's IPC message queue, whereupon the receiver may retrieve the duplicated handle from the message buffer and access the resource using the handle in accordance with the relevant handle information.

In accordance with yet other aspects of the present invention, a computer-accessible medium for sharing resources is provided, including a medium for storing data structures and computer-executable components for passing references to resources from a sender to a receiver using an IPC. The data structures define the references, buffers, tables, queues, and other components in the trusted third-party environment in a manner that is generally consistent with the above-described systems and methods. Likewise, the computer-executable components are capable of performing actions generally consistent with the above-described systems and methods.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In a typical operating environment, processes often need to share access to system resources. For example, client processes may need to share access to files with a server process or other client processes. Or a worker process might perform services on behalf of a process that hosts services, and may need to have access to an event object to perform its task.

Access to system resources is often regulated through the use of a reference, such as a pointer that points to the location of the resource in memory.

In the WINDOWS® operating environment, the system resource may be represented by an object, and access to the object is regulated through the use of a reference called a handle. When access to the resource is needed by more than one process, the object's handle may be duplicated. A duplicate handle refers to the same object as the original handle, and any changes to the object are reflected through both handles. The duplicate handle may or may not have the same functionality as the original handle. For example, access to the object may be more restricted using the duplicate handle, or the duplicate handle may not be inheritable.

As previously noted, one of the problems encountered when processes use duplicate handles to share resources is that the processes must fully trust one another. This is because the access right that allows handles to be duplicated from one process to another gives complete control over that process, thereby elevating its privilege. For mutually un-trusted processes that only want to grant handle duplication rights to specific objects, a trusted third party is needed.

In the following discussion, a computing system that is suitable for implementing a reference passing system that enables processes to share access to resources using a trusted third party in accordance with embodiments of the present invention is described in detail. The role of the trusted third party is played by an inter-process communication ("IPC") operating in a trusted third party environment, such as an operating system kernel. In the description that follows, an the term IPC generally refers to technology that enables programs and other types of software processes to communicate with one another. One example of an IPC suitable for implementing an embodiment of the present invention is the local procedure communication LPC functionality available in the WINDOWS® operating system.

Figure 1:
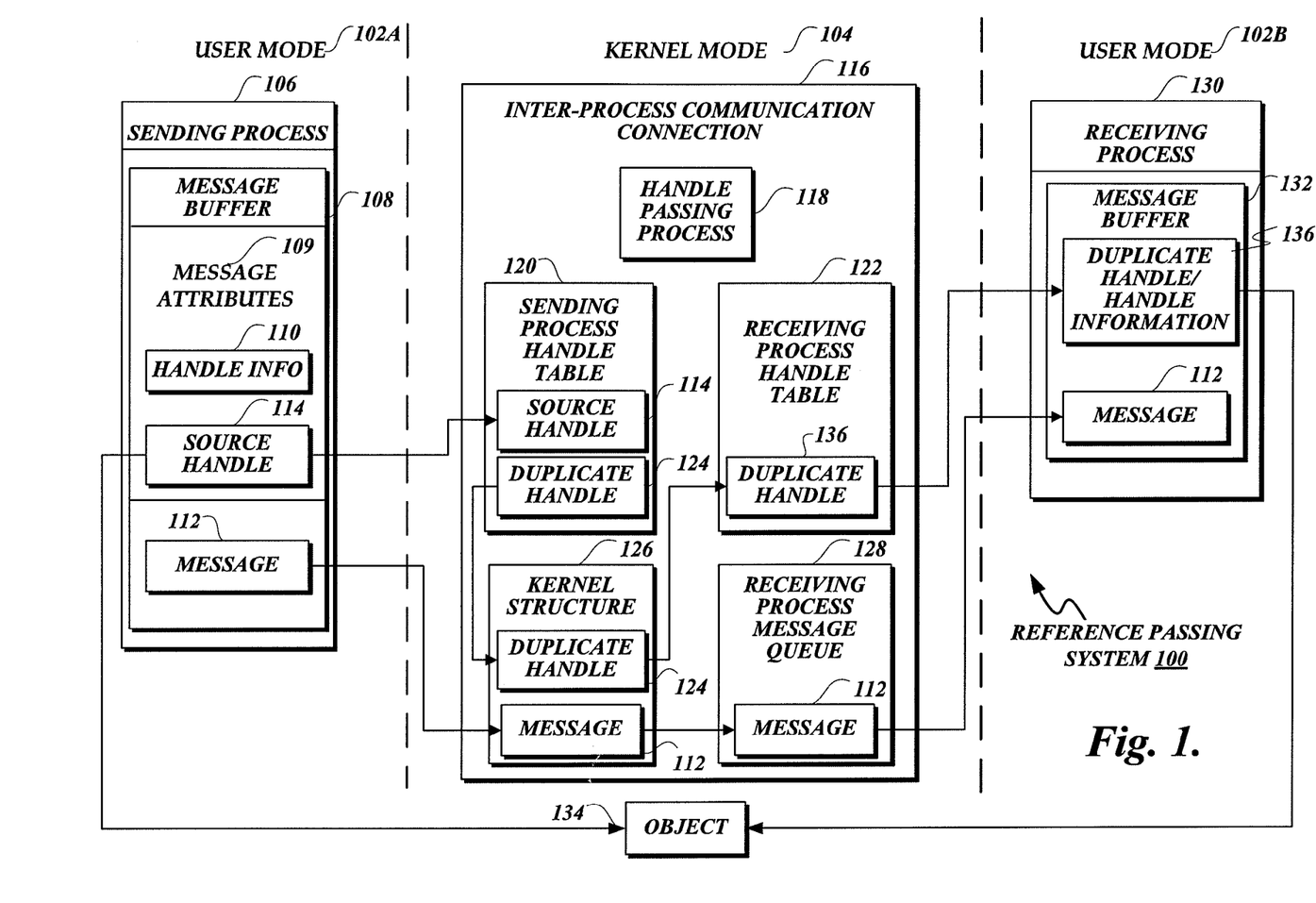
FIG. 1 is a block diagram depicting an overview of a reference passing system in accordance with the present invention.

FIG. 1 is a block diagram depicting an overview 100 of reference passing system, in which references to system resources may be passed in accordance with the present invention. As shown, a sending process 106 is in possession of a source handle 114 that references an object 134 representing a system resource to which the sending process wants to share access with the receiving process 130. The sending process 106 initiates a request to establish an IPC connection 116 with the receiving process 130 in order to prepare to pass the source handle 114 to the receiving process 130 as will be described in further detail with reference to FIG. 2. The process receiving the connection can also pass handles to the source process if the sources process is willing to accept them. Thus the handle passing is not unidirectional.

In a typical embodiment, once the IPC connection 116 has been established, the sending process 106, operating in user mode 102A, prepares to pass the source handle 114 to the receiving process 130 by initializing a message buffer 108 with private message data 112, and message attributes 109, including the source handle 114, any relevant handle information 110, and any other attributes such as views and security contexts. The message attributes 109 are validated by the IPC so that the receiving process 130 can trust them. The relevant handle information 110 includes but is not limited to the value of the handle, the type of resource that the object 134 represents, and various other information that is used in passing the handle 114 to the receiving process 130. Also operating in user mode 102B, the receiving process 130 is enabled to receive a duplicate 134 of the passed source handle 114 by initializing a message buffer 132 with appropriate message data 112. The message buffers 108 and 132 may be comprised of one or more physical buffers.

In one embodiment, the IPC connection 116 controls whether the source handle 114 is successfully passed to the receiving process 130 through the use of a handle passing process 118 operating in a trusted third party environment, illustrated here as the kernel mode 104. In operation, the handle passing process 118 receives the source handle 114 in a sending process handle table 120, and creates a duplicate handle 124 in the table 120. The handle passing process 118 further creates a kernel structure 126 into which is received the message 112. A copy of the duplicate handle 124 is associated with the received message 112 in the kernel structure 126.

In a typical embodiment, once the kernel structure 126 is created with the received message 112 and associated duplicate handle 124, the handle passing process 118 queues the message in the receiving process message queue 128, and notifies the receiving process that the message is ready to be retrieved. Eventually, the IPC connection 116 receives a call from the receiving process 130 to retrieve the message 112, whereupon the handle passing process 118 determines whether to pass the duplicate handle 124 that has been associated with the message 112.

In one embodiment, the determination of whether to pass the duplicate handle 124 depends on whether the receiving process 130 has a message buffer 132 that is enabled to receive the duplicate handle. If enabled, the handle passing process first determines whether to accept the duplicate handle 124 based on whether the type of the resource that the handle references is one of the types of resource in which the receiving process is interested, as previously specified when the connection was created. If so, the duplicate handle 124 is duplicated into the receiving process handle table 122 as duplicate handle 136, and the receiving process 130 is notified of the handle's value and the resource type that the handle references. The receiving process 130 can then retrieve the handle 136 as needed into the receiving process 130 message buffer 132 along with the message 112.

In a typical embodiment, the handle passing process 118 concludes the handle passing by closing the duplicate handle 124 in the sending process handle table 120 and kernel data structure 126 as it is no longer needed after the handle is successfully passed.

Figure 2:
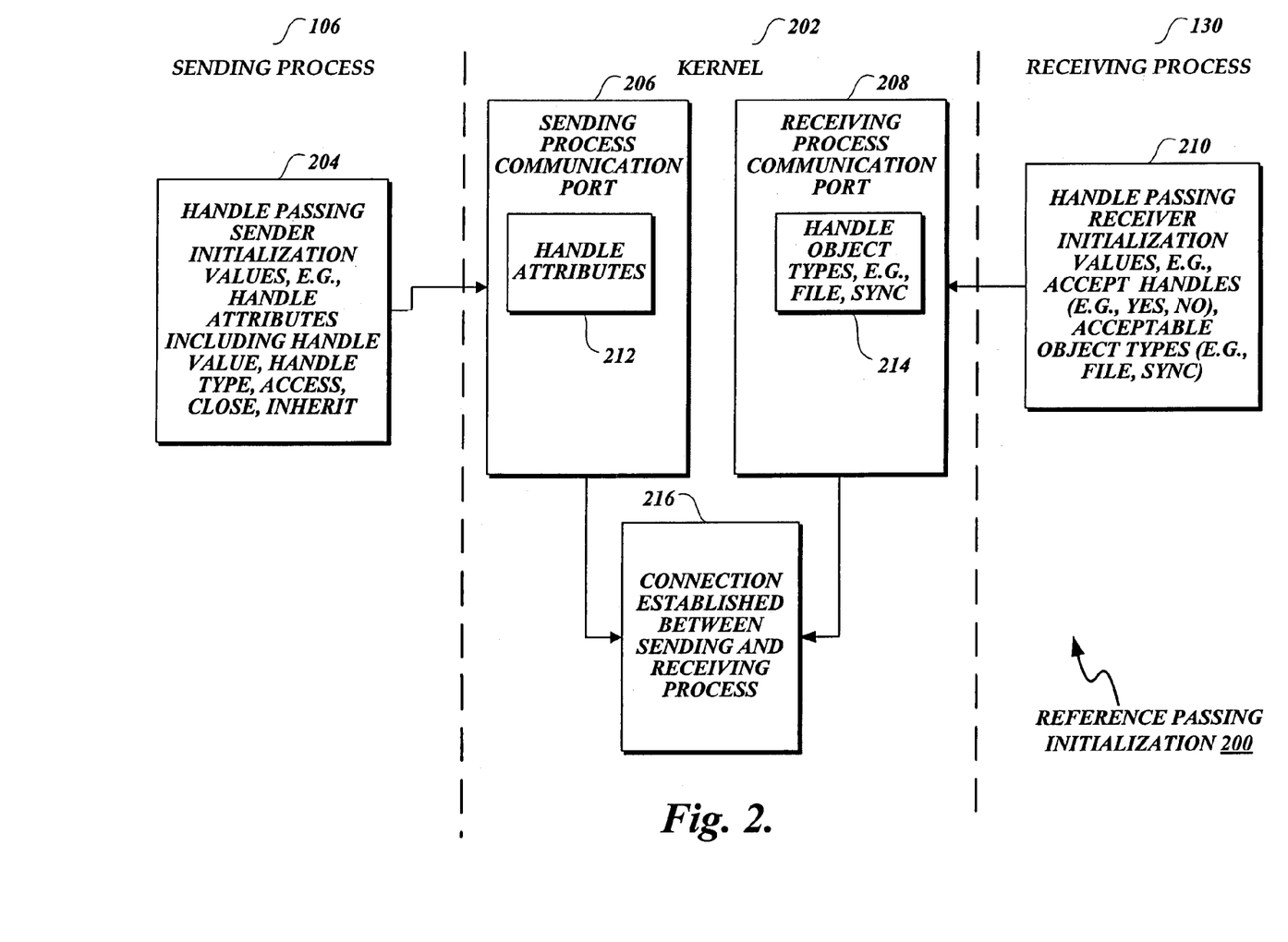
FIG. 2 is a block diagram depicting initialization of a reference passing system and one suitable operating environment in which references may be passed in accordance with the present invention.

FIG. 2 is a block diagram depicting initialization 200 of a reference passing system and one suitable operating environment in which references may be passed in accordance with the present invention.

As shown, the sending process 106 provides handle passing sender initialization values 204 in a handle attribute buffer, including but not limited to the handle's value, handle type, and various flags that control the handle passing process. The flags may include the desired access flag, i.e., whether the duplicate handle will have the same access to the object 134 as the source handle 114, the close source flag, i.e., whether to close the source handle after passing, and the inherit flag, i.e., whether the duplicate handle that is passed may be inherited by new process created the receiving process 130. Of course, the described values and flags are for the sake of illustration, and other types of flags or values may be used in an embodiment of the invention without departing from the scope of the claims that follow.

The receiving process 130 also provides receiver initialization values 210, such as a flag indicating whether to accept handles at all, e.g., YES or NO, and values that specify the acceptable types of objects for which handles may be passed, i.e., the types of resources that are of interest to the receiving process from a particular sending process 106, such as file type objects, including handles to files, named pipes, and mailslots, and synchronization type objects, such as events, mutexes, and semaphores.

In a typical embodiment, the trusted third party environment, e.g., the kernel 202 includes the sending process communication port 206 that represents the sending process side of the IPC connection 116, and the receiving process communication port 208 that represents the receiving process side of the IPC connection 116. After a connection has been established between the sending and receiving processes at block 216, both the sending port 206 and the receiving port 208 may hold information (212 and 214, respectively) about the handles that their process may accept, such as the acceptable object types.

Figure 3:
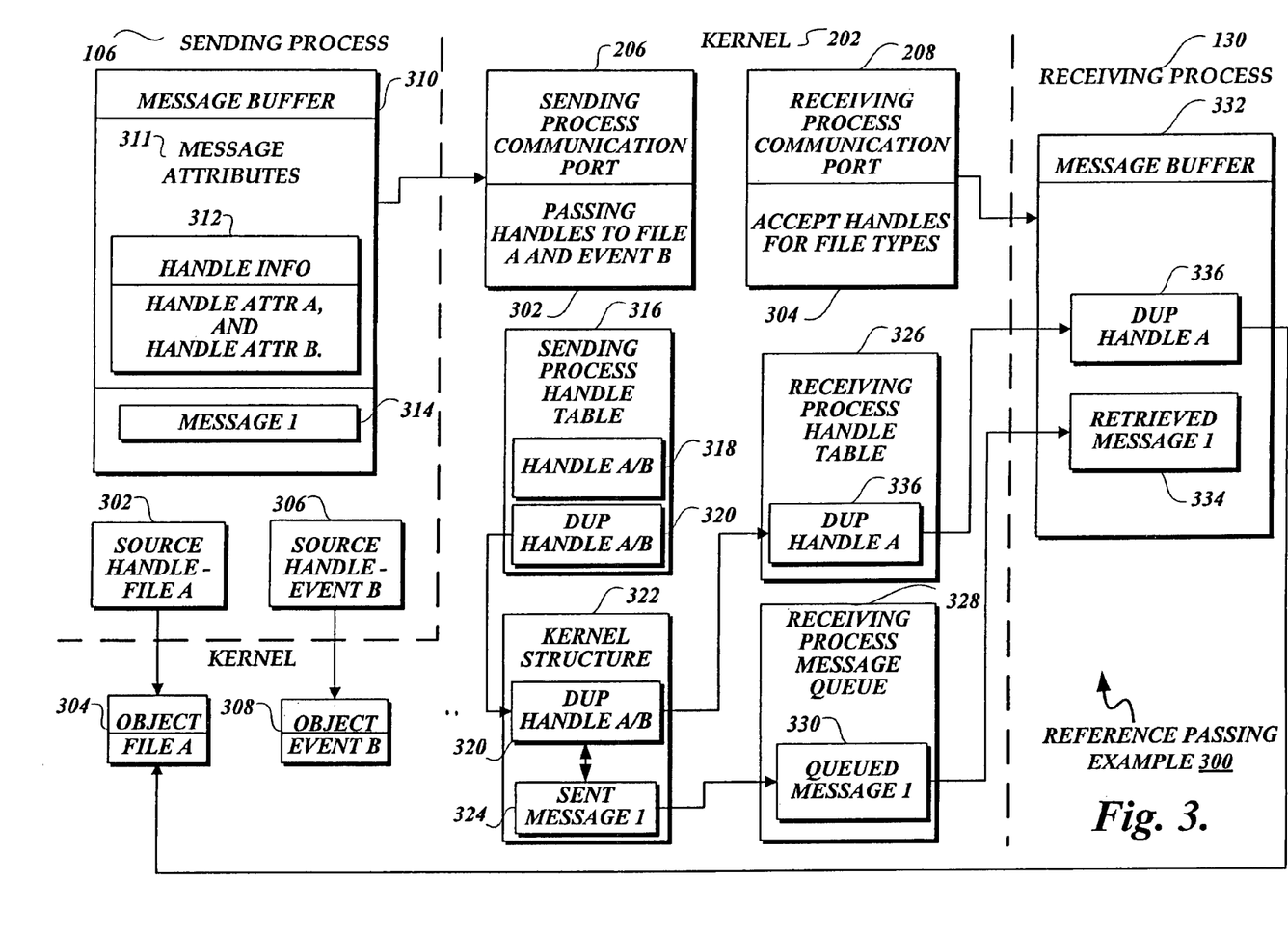
FIG. 3 is a depiction of an example of passing a reference using the reference passing system illustrated in FIGS. 1 and 2, in accordance with an embodiment of the present invention.

FIG. 3 is a depiction of an example of 300 passing a reference using the reference passing system illustrated in FIGS. 1 and 2, in accordance with an embodiment of the present invention. In the illustrated example, the sending process 106 is attempting to pass handles 302 and 306 to the respective file object A 304 and event object B 308 to the receiving process 130. However, the receiving process 130 is only interested in receiving handles for file objects, so only source handle 302 for object File A 304 is successfully passed.

As shown, a sending process 106 includes a message buffer 310 holding message attributes 311 and a message I 314, the message attributes 311 having been further initialized with handle information 312 for source handles A 302 and B 306. Source handle A 302 is a file object, and Source handle B is an event object, and they each reference objects residing in the kernel 202, respectively object File A 304, and object File B 308.

In the illustrated embodiment, the receiving process 130 includes its own message buffer 332 showing that message I 314 has been retrieved into the buffer as retrieved message I 334. In addition, a duplicate handle A 336 corresponding to the source handle 302 for object file A 304 has been successfully passed and references the same object file A 304.

As shown, the kernel 202, functioning as the trusted third party intermediary between the sending process 106 and the receiving process 130, includes the sending process communication port 206. Accordingly, the components of the kernel 202 that operate in the context of the sending process 106, include a sending process handle table 316 that contains source 318 and duplicate 320 handles for both handle A and B. Likewise, the kernel structure 322 contains the duplicate handles 320 for both handle A and B.

The kernel 202 also includes the receiving process communication port 208 indicating that the receiving process 208 will only accept handles for objects that are file types. Accordingly, the components of the kernel 202 that operate in the context of the receiving process 130 include a receiving process handle table 326 that contains the duplicate handles 336 for only handle A, because handle A represents the object File A 304, one of the acceptable types specified by the receiving process 130.

In the illustrated example, the components of the kernel 202 that operate in the context of the receiving process 130 further include a receiving process message queue 328 that contains the queued Message I 330 corresponding to the Message I 314 in the message buffer 310, and further to the sent message I 324 in the kernel structure 322.

Figure 4A:
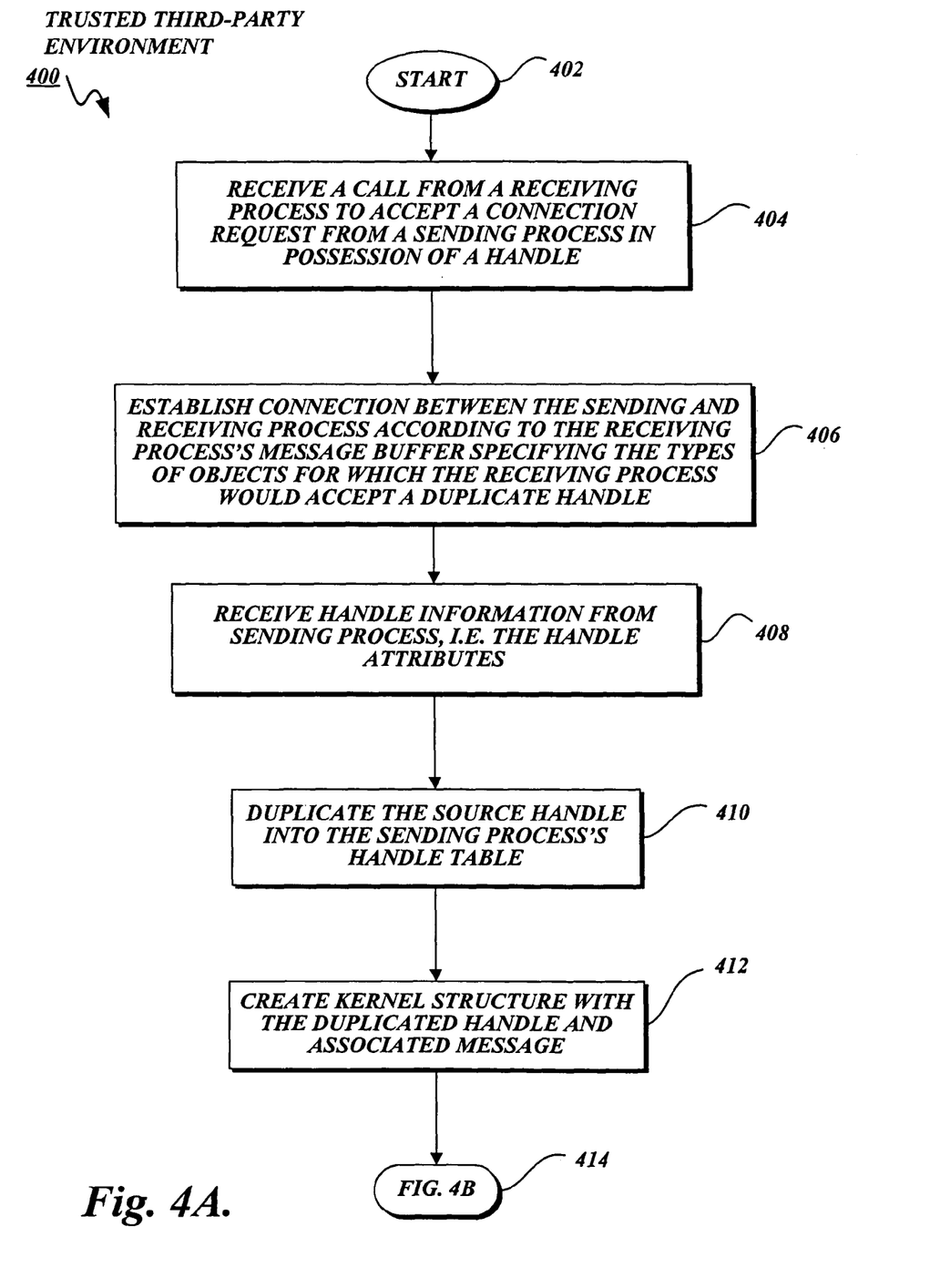
FIGS. 4A-B are flow diagrams illustrating the logic performed in a trusted third party environment for passing references using the reference passing system as illustrated in FIGS. 1 and 2, in accordance with an embodiment of the present invention.
Figure 4B:
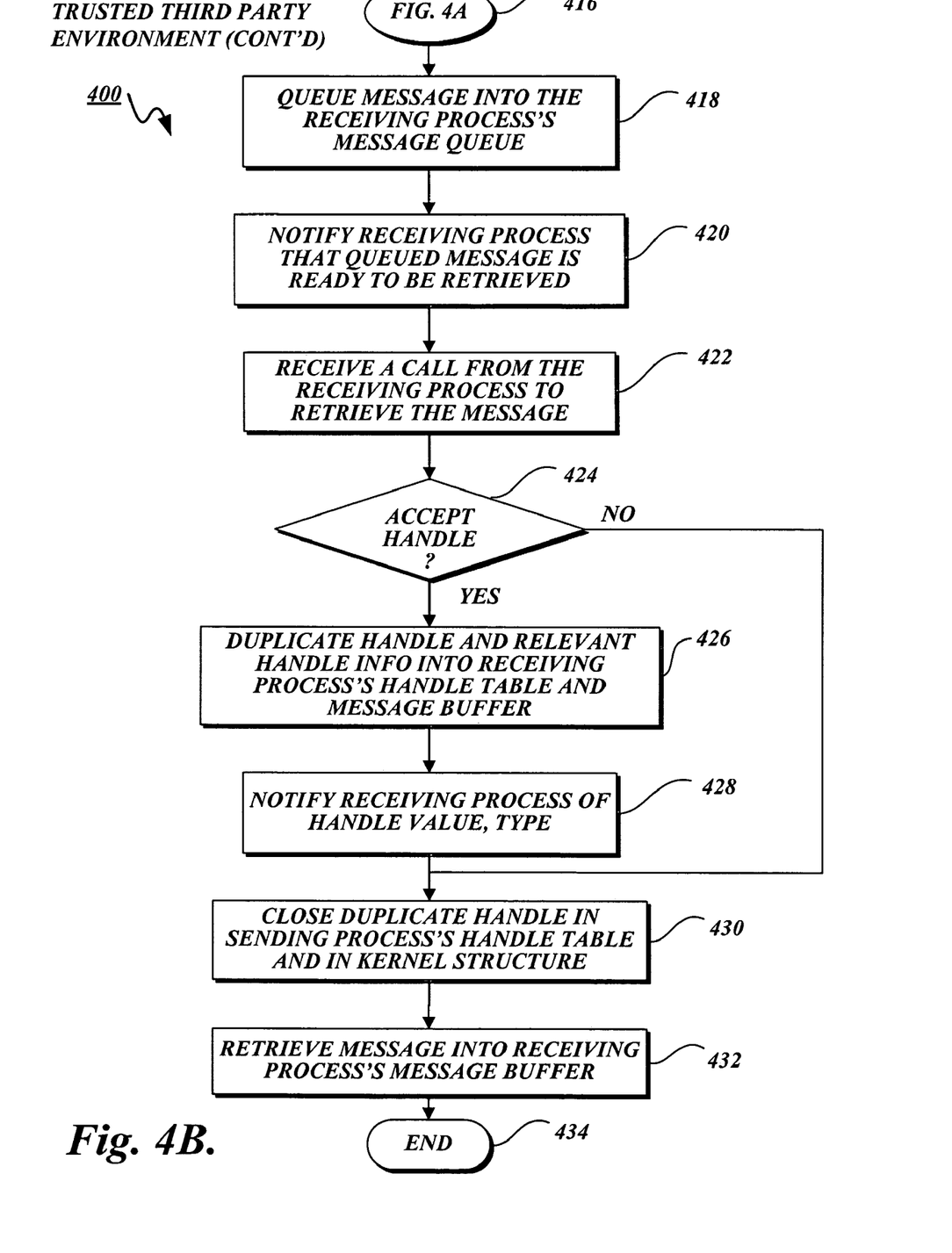

Turning now to the flow diagrams in FIGS. 4A-4B illustrating the method performed in a trusted third party environment for passing references using the reference passing system as illustrated in FIGS. 1 and 2, in accordance with an embodiment of the present invention. Starting at process block 402, the method 400 begins with a process 404 to receive a call from a receiving process to accept a connection request from a sending process in possession of a handle. At process 406, the method 400 establishes a connection between the sending and receiving processes according to information sent in during establishing the connection specifying the types of objects each side would accept a duplicate handle. In one embodiment the method establishes the connection by setting a communication port with values indicating whether either process is accepting handles, and if so, for what specified types of objects. After the connection is established either side can send handles to the other side. At process 408, the method 400 continues, receiving handle information from the sending process, such as the source handle or handle value of the handle being passed, the type of object that the handle references, the desired access, whether to close the source handle after passing, and whether to allow the handle to be inherited. Upon receipt of the handle information, the method 400 continues at process 410 to duplicate the source handle into the sending process handle table in accordance with the handle information. The method 400 further continues at process 412 to create a kernel structure in the trusted third party environment to hold a copy of the duplicated handle and the sender's associated message. The method 400 then continues to FIG. 4B, as shown in block 414.

Turning to FIG. 4B, the method 400 continues (block 416) operating in the trusted third party environment at process 418 to queue the sender's message into the receiving process's message queue. At process 420, the method 400 notifies the receiving process that the queued message is ready to be retrieved. Eventually, at process 422, upon receiving a call from the receiving process to retrieve the message, the method 400 makes a decision 424 whether to accept any handles present in the message buffer along with the message.

Turning to FIG. 4B, the method 400 continues operating in the trusted third party environment at process 418 to queue the sender's message into the receiving process's message queue. At process 420, the method 400 notifies the receiving process that the queued message is ready to be retrieved. Eventually, at process 422, upon receiving a call from the receiving process to retrieve the message, the method 400 makes a decision 424 whether to accept any handles present in the message buffer along with the message.

In one embodiment, the decision 424 whether to accept any handles depends at least in part on the identity of the sending process. In some cases that aspect of the decision has already been made, since the connection itself would not exist if the receiving process had refused the connection request from the sending process. In other cases, the connection may be shared with a number of other sending processes, in which case the decision must be made based on the current sending process information.

Upon making a decision to accept the handle, the method 400 continues at process 426 to duplicate the handle and the relevant handle information into the receiving process handle table and message buffer. At process 428, the method 400 notifies the receiving process of the accepted handle's value and type. The method 400 then continues at process 430 to close the duplicate handle in the sending process handle table and kernel structure as they are no longer needed. The method concludes at process 432 by retrieving the message into the receiving process message buffer in order to make the message and any handles that may have accompanied the message available to the receiving process. The method 400 may then end at block 434.

Figure 5:
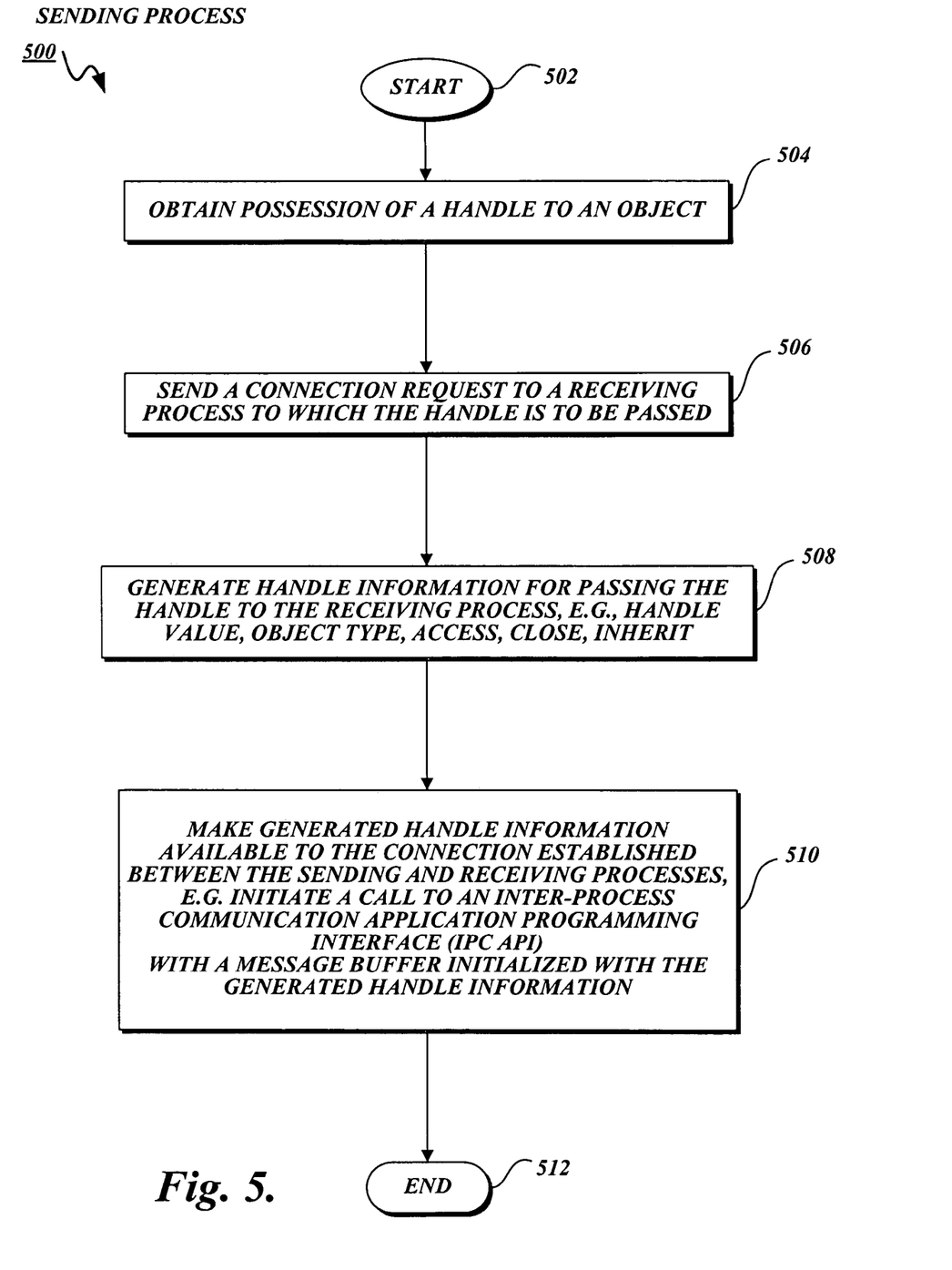
FIG. 5 is a flow diagram illustrating the logic performed in a sending process for passing a reference in accordance with an embodiment of the present invention.

FIG. 5 is a flow diagram illustrating a method 500 performed in a sending process for passing a reference using an IPC in accordance with an embodiment of the present invention. Starting at process block 502, the method 500 begins with process 504, in which the sending process obtains a reference to a resource, such as by obtaining a handle referencing an object representing the resource. At process block 506, the method 500 sends a connection request to a receiving process to which the handle is to be passed, the receiving process being a process with which the sending process wants to share access to the resource, such as a client process wanting to share a file with a server process, or a worker thread wanting to share an event with a host process so that it can perform a task on behalf of the host.

Either before or after the connection request has been accepted by the receiving process, and the connection has been established, at process block 508, the sending process prepares to pass the handle by generating the necessary handle information, such as the values of the handle, object type, desired access, whether to close the original source handle after it is passed, and whether to allow the handle to be inherited after it is passed.

The method 500 continues at process block 510 in which the method 500 makes the generated handle information available to the IPC connection that was established between the sending and receiving processes. In one embodiment, the information may be made available to the IPC connection by initiating a call to the IPC application programming interface with a message buffer that has been initialized with the generated handle information. Once the information has been made available, the method 500 concludes at termination oval 512. The passing of the handle is then controlled in the IPC connection as previously described with reference to FIGS. 4A-4B, and, if successful, the handle is made available to the receiving process as will be described in FIG. 6.

Figure 6:
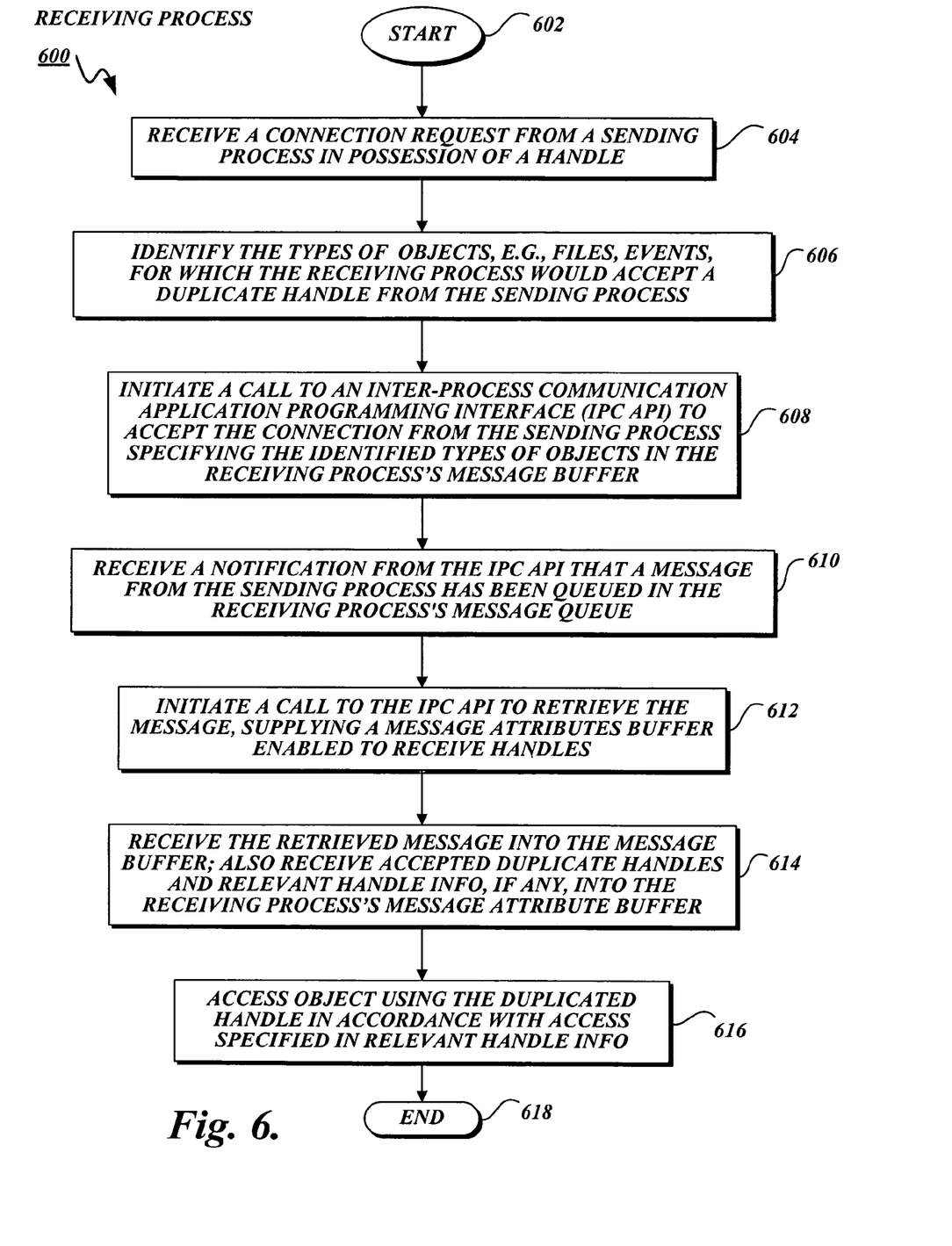
FIG. 6 is a flow diagram illustrating the logic performed in a receiving process for passing a reference in accordance with an embodiment of the present invention.

FIG. 6 is a flow diagram illustrating the method 600 performed in a receiving process for passing a reference in accordance with an embodiment of the present invention. Starting at process block 602, the method 600 begins at process block 604 to receive a connection request from a sending process in possession of a handle. The method 600 continues at process block 606 to identify the types of objects for which the receiving process would accept a duplicate of the handle passed from the sending process. For example, the method 600 may identify file types of objects when the receiving process is a server, or synchronization types of objects when the receiving process is a host that has requested the sending process to perform a task on its behalf.

The method 600 continues at process block 608 to accept or refuse the connection requested by the sending process. In one embodiment, if accepting the connection, the method 600 specifies the identified types of objects that the receiving process would accept in the receiving process message buffer, and initiates a call to the IPC API with the message buffer. The message buffer is now enabled to receive handles corresponding to the identified types of objects.

Eventually, at process block 610, the method 600 receives a notification from the IPC API that a message from the sending process has been queued in the receiving process's message queue. In a typical embodiment, at process block 612, the method 600 initiates a call to the IPC API with the message buffer enabled to receive the handles. At process block 614, the method 600 receives the retrieved message into the message buffer. The method 600 also receives accepted duplicate handles and any relevant handle information, if any, into the message buffer.

Upon receiving the accepted duplicate handles into the message buffer, the method 600 is now able, at process block 616, to access the object using the duplicated handle in accordance with the desired access specified in the relevant handle information. Upon accessing the object, the method 600 concludes at termination oval 618.

In the foregoing discussion, a computing system suitable for implementing various features of passing a reference using an IPC in accordance with embodiments of the invention includes, for example, a personal computer usable in a distributed computing environment, in which complementary tasks may be performed by remote computing devices linked together through a communication network. However, those skilled in the art will appreciate that embodiments of the invention may be practiced with many other computer system configurations. For example, embodiments of the invention may be practiced with a personal computer operating in a standalone environment, or with multiprocessor systems, minicomputers, mainframe computers, and the like. In addition, those skilled in the art will recognize that embodiments of the invention may be practiced on other kinds of computing devices including laptop computers, tablet computers, personal digital assistants (PDAs), cell phones, game consoles, personal media devices, or any device upon which computer software is installed.

For the sake of convenience, some of the description of the computing system suitable for implementing various features of the invention may have included references to the WINDOWS® operating system, and/or references to various other Microsoft products. However, those skilled in the art will recognize that those references are only illustrative and do not serve to limit the general application of embodiments of the invention. For example, embodiments of the invention may be practiced in the context of other operating systems such as the LINUX® or UNIX® operating systems, and other general-purpose software.

Certain aspects of embodiments of the invention have been described in terms of programs executed or accessed by an operating system in conjunction with a personal computer. However, those skilled in the art will recognize that those aspects also may be implemented in combination with various other types of program modules or data structures. Generally, program modules and data structures include routines, subroutines, programs, subprograms, methods, interfaces, processes, procedures, functions, components, schema, etc., that perform particular tasks or implement particular abstract data types.

What is claimed is:

1. A method for passing a reference to a resource, the method comprising:

establishing a connection, using an interprocess communication executing in a kernel of an operating system executing on a computer, between a sending process operating in a user mode of the operating system in possession of a reference to a resource and a receiving process operating in the user mode of the operating system to which the reference is to be passed, wherein the reference is a handle to an object representing the resource;

initializing, using the sending process, a first buffer associated with the sending process, the first buffer comprising the reference and information associated with the reference, wherein the information comprises a type of the resource referenced by the reference and whether to allow a duplicate of the reference to be inherited by a new process created by the receiving process after the duplicate of the reference is passed to the receiving process, the type of the resource includes at least one of a file object and a synchronization object;

when the connection has been established, determining, using the interprocess communication, whether the reference to the resource is acceptable to the receiving process, wherein the determining comprises receiving an indication from the receiving process of a type of resource acceptable to the receiving process, determining whether the type of the resource referenced by the reference is acceptable to the receiving process, and whether the receiving process is associated with a second buffer comprising space to receive the reference; and when it is determined that the reference is acceptable by the receiving process, passing, using the kernel, through the connection a duplicate of the acceptable reference and a duplicate of the information associated with the reference to the second buffer of the receiving process.

2. The method of claim 1, wherein determining whether the reference to the resource is acceptable to the receiving process includes determining whether the receiving process is accepting references.

3. The method of claim 1, wherein passing through the connection an acceptable reference to the receiving process includes duplicating the reference in the first buffer, and making the duplicated reference available in the second buffer associated with the receiving process by generating the duplicate of the acceptable reference in the second buffer.

4. The method of claim 1, wherein the information associated with the reference further comprises at least one value of the reference and whether to close the duplicate of the reference after it is passed to the receiving process.

5. A system comprising at least one processor for passing handles using inter-process communication, the system further comprising:

an interprocess communication executing in a kernel of an operating system executing on the at least one processor, the operating system comprising a user mode executing a sending process and a receiving process, wherein the interprocess communication establishes a connection between the sending process and the receiving process; and the sending process initializing a first buffer associated with the sending process, the first buffer comprising a reference to a resource and information associated with the reference, wherein the reference is a handle to an object representing the resource, the information comprises a type of the resource referenced by the reference and whether to allow a duplicate of the reference to be inherited by a new process created by the receiving process after the duplicate of the reference is passed to the receiving process, wherein the type of the resource includes at least one of a file object and a synchronization object;

wherein the interprocess communication is configured to, in the kernel:

when the connection has been established, determine whether the reference to the resource is acceptable to the receiving process by receiving an indication from the receiving process of a type of resource acceptable to the receiving process, determining whether the type of the resource referenced by the reference is acceptable to the receiving process, and determining whether the receiving process is associated with a second buffer comprising space to receive the reference; and when it is determined that the reference is acceptable by the receiving process, pass through the connection a duplicate of the acceptable reference and a duplicate of the information associated with the reference to the second buffer of the receiving process.

6. The system of claim 5, wherein the file object is one of a file, a named pipe, and a mailslot.

7. The system of claim 5, wherein the synchronization object is one of an event, a mutex, and a semaphore.

8. A computer-accessible memory device having stored thereon instructions for passing handles using an inter-process communication connection, the instructions, when executed by a processor, cause the processor to perform a method comprising:

establishing a connection, using an interprocess communication executing in a kernel of an operating system executing on a computer, between a sending process operating in a user mode of the operating system in possession of a reference to a resource and a receiving process operating in the user mode of the operating system to which the reference is to be passed, wherein the reference is a handle to an object representing the resource;

initializing, using the sending process, a first buffer associated with the sending process, the first buffer comprising the reference and information associated with the reference, wherein the information comprises a type of the resource referenced by the reference and whether to allow a duplicate of the reference to be inherited by a new process created by the receiving process after the duplicate of the reference is passed to the receiving process, the type of the resource includes at least one of a file object and a synchronization object;

when the connection has been established, determining, using the interprocess communication, whether the reference to the resource is acceptable to the receiving process, wherein the determining comprises receiving an indication from the receiving process of a type of resource acceptable to the receiving process, determining whether the type of the resource referenced by the reference is acceptable to the receiving process, and whether the receiving process is associated with a second buffer comprising space to receive the reference; and when it is determined that the reference is acceptable by the receiving process, passing, using the kernel, through the connection a duplicate of the acceptable reference and a duplicate of the information associated with the reference to the second buffer of the receiving process.

9. The computer-accessible memory device of claim 8, wherein receiving the duplicate of the acceptable reference further includes receiving an instruction to access the object using the duplicate of the acceptable reference in accordance with handle attributes.

10. The computer-accessible memory device of claim 9, wherein the handle attributes include at least one of an access flag indicating whether the duplicate of the acceptable reference has the same access to the object as the reference, and a close source flag indicating whether the reference should be closed.

11. The computer-accessible memory device of claim 10, wherein the handle attributes further include at least one of a value of the reference, and a desired access requested for the duplicate of the acceptable reference, wherein the desired access controls access to the object using the duplicate of the acceptable reference.

12. The computer-accessible memory device of claim 8, wherein the IPC connection is established in a trusted third-party environment.

13. The computer-accessible memory device of claim 12, wherein the trusted third-party environment is an operating system kernel mode.

* * * * *